United States Patent
Smith

(10) Patent No.: US 7,284,660 B2
(45) Date of Patent: Oct. 23, 2007

(54) CONTAINER FOR STORING MULTIPLE SAW BLADES

(76) Inventor: David Smith, 428 W. Silver, Butte, MT (US) 59701

(*) Notice: Subject to any disclaimer, the term of this patent is extended or adjusted under 35 U.S.C. 154(b) by 55 days.

(21) Appl. No.: 10/707,696

(22) Filed: Jan. 5, 2004

(65) Prior Publication Data

US 2005/0145511 A1 Jul. 7, 2005

(51) Int. Cl.
B65D 85/02 (2006.01)

(52) U.S. Cl. .................................. 206/349; 206/303

(58) Field of Classification Search ...... 206/0.81–0.84, 206/349, 303, 373, 581
See application file for complete search history.

(56) References Cited

U.S. PATENT DOCUMENTS

| | | | |
|---|---|---|---|
| 1,500,136 A | | 7/1924 | Knowlton |
| 1,992,630 A | * | 2/1935 | Piperoux .................... 206/743 |
| 2,410,585 A | * | 11/1946 | Leitner ...................... 220/4.22 |
| 2,459,460 A | | 1/1949 | Segal |
| 2,582,421 A | * | 1/1952 | Essman ...................... 312/201 |
| 3,053,424 A | | 9/1962 | Reinhard |
| 3,259,231 A | | 7/1966 | Romanowski |
| 3,392,868 A | * | 7/1968 | Pfrommer ................... 220/520 |
| 3,870,148 A | | 3/1975 | Hite |
| 3,871,519 A | * | 3/1975 | Groomes .................... 206/579 |
| 4,239,308 A | * | 12/1980 | Bradley ...................... 312/201 |
| 4,588,082 A | | 5/1986 | Ridings |
| 4,875,743 A | * | 10/1989 | Gelardi et al. ............. 312/9.42 |
| 5,078,266 A | * | 1/1992 | Rackley ...................... 206/349 |
| 5,337,892 A | * | 8/1994 | Zaffina .................. 206/315.11 |
| 5,370,255 A | * | 12/1994 | Yang .......................... 220/4.27 |
| 5,425,451 A | * | 6/1995 | Blase ......................... 206/313 |
| 5,542,206 A | * | 8/1996 | Lisch ......................... 43/54.1 |
| 5,547,078 A | * | 8/1996 | Iida .......................... 206/308.1 |
| 5,715,939 A | * | 2/1998 | Yun-Ming ................ 206/308.3 |
| 5,725,096 A | * | 3/1998 | Winnard ..................... 206/350 |
| 5,797,488 A | * | 8/1998 | Yemini ....................... 206/349 |
| 5,799,787 A | * | 9/1998 | Talbot .................... 206/315.11 |
| 6,145,515 A | * | 11/2000 | Wu ............................ 132/295 |

* cited by examiner

Primary Examiner—David T. Fidei
(74) Attorney, Agent, or Firm—Blackwell Sanders LLP

(57) ABSTRACT

A container for storing and transporting multiple circular saw blades. This invention provides for a circular, portable, carrying case to safely and conveniently store and transport circular saw blades. The invention has several circular trays and each tray had an insert that houses and securely segregates the circular saw blades. The tray and insert feature protects the user from being injured by the saw blades and ensures that the blades do not become dull due to their moving around in the around in the storage container. The invention provides that each circular tray rotates and swings open to allow the user easy access to the saw blades contained inside the storage container. There is a pen that extends through each tray and the pen provides a means for the pivoting action, rotating and swinging action of each circular tray. Each tray has a latching mechanism that secures the tray in place so that the tray does not inadvertently swing open. A carrying handle is located on top of the storage container, and it provides a method by which the invention can be transported by the user.

6 Claims, 5 Drawing Sheets

CONTAINER FOR STORING MULTIPLE SAW BLADES

BACKGROUND OF INVENTION

The present invention relates to a multiple drawer storage container that securely stores circular saw blades, and more particularly a plastic storage container that holds multiple circular saw blades of various diameters in an organized and safe manner.

Circular saw blades with angled teeth are used extensively for cutting any material mainly because of their rapid and accurate cutting action and ability to cut for a reasonable period of duration without sharpening. A circular saw blade contains a hole in the center and is of a planar design with peripheral teeth. Circular saw blades come in various diameters as well as various saw blade thicknesses since they are designed for cutting specific material such as wood, metal or masonry.

Using circular saw blades possess many benefits for carpenters and other users, yet these blades are also precision cutting tools that require proper maintenance and storage to remain sharp and useable. The saw blades are often used under severe conditions, and as a result the teeth become arched, scratched, fragmented, or dulled in numerous manners. Such damage requires the user to change saw blades from time to time; since dull blades do not cut with the same precision as sharp saw blades. Some storage devices for multiple saw blades are non-portable and are not readily designed for the user"s convenience to store sharp or dulled saw blades.

Given that angled teeth of circular saw blades are precision cutting tools, the user must apply care when storing and handling saw blades in order to safeguard against both moisture, which rusts metal blades and negatively affects the blades cutting performance, or contact with other blades and tools, which may lead to dulled cutting teeth.

In the past a box without a lid could be employed to carry the saw blades. The box had a strap connected on opposite sides of the box for carrying. Yet to carry blades in such an open box could cause bodily injury to the user carrying the box and/or damage the blades, which would be rubbing against each other. Circular saw blades are cutting tools that require care and can be expensive to either replace or re-sharpen the damaged angular teeth. The protection of the saw blade when transferring and storing is a problem because of moisture and contact with other saw blades. Assortments of storage devices have been formed in an attempt to address the need to provide adequate protection for circular saw blades.

U.S. Pat. No. 4,588,082 issued to Jody W. Ridings on May 13, 1986 shows a portable carrying case for circular saw blades formed of plastic with hinges at two places resulting in a book-like casing; yet unlike the present invention this book like casing device carries only a singular circular saw blade and because of its triangular shape may fall over easily if accidentally pushed.

U.S. Pat. No. 2,459,460 issued to Arthur R. Segal on Jan. 18, 1949 shows a packing case for shipping and/or storage of circular saw blades by detaining the saw blades between two panes of Masonite and clamped on opposite sides of the saw with a single bolt through the center. Unlike the present invention, this storage device stores only one size of circular saw blades, and each blade does not have its own storage tray, thus this device does not provide a storage method that is organized and efficient as the present invention.

U.S. Pat. No. 3,870,148 issued to Harold H. Hite on Mar. 11, 1975 shows a carrying case with a hinged top for storing a multiple number of circular saw blades. Unlike the present invention, this particular device is configured in a box shape and the blades move freely within compartments formed by separator inserts, due to a lack of constraints within each compartment to prevent such movement.

U.S. Pat. No. 3,053,424 issued to Cheyenne A. Reinhard on Sep. 11, 1962 shows a carrier for saw blades, which secures the blades vertically between two end plates with a horizontal spindle. Unlike the present invention, this particular device contains open sides, which expose the blades to elements, and the uncovered sharp edges of the saw blades can be fragmented or cause bodily injury or destruction to a person or material.

U.S. Pat. No. 3,259,231 issued to Henry J. Romanowski on Jul. 5, 1966 shows a plastic package for circular saw blades having two plastic circular discs with a hub in the center. Yet, unlike the present invention, this device is intended primarily for display and is limited in the amount of saw blades the display may hold.

U.S. Pat. No. 1,500,136 issued to Henry N. Knowlton on Jul. 8, 1924 shows a crate designed for the shipment of flat articles such as circular saws; yet unlike the present invention, this device is formed of lumber and may lack sufficient durability that plastic provides.

Using a singular storage device to protect the saw blade from damage creates saw blade efficiency issues for the user, while the use of a multiple blades storage container provides the user with the ability to be able to locate and safely store multiple saw blades in a single container. Different saw blades are utilized for cutting different materials and provide the user with the ability to cut materials efficiently. For example, the size and teeth pattern of a saw blade correlate with a particular type of material and cutting task. Thus if blades are not stored in an organized, easy accessible manner, injury to the user may be caused when removing a blade, or prevent the user from quickly locating the saw blade.

Thus there is a need for an invention that securely holds and stores multiple circular saw blades as well as multiple sized saw blades in a single container, yet is especially convenient to transport, and in addition organize blades in a resourceful manner.

SUMMARY OF INVENTION

The present invention improves upon the various previous methods of providing protection in cited patents by being effortless to use, convenient, portable, as well storing multiple saw blades of various diameters and thicknesses individually in an organized efficient manner and designed in a style that provides extreme protection of circular saw blades.

The circular saw blades are securely contained in individual horizontal storage trays that protect saw blades, with includable or removable inserts provided for storing various diameters and thickness individually. Placing the saw blades in individual storage trays ensures that the blades are firmly contained so that they cannot gash the user or any surrounding objects and they are firmly contained so that the blades are not dulled or damaged through contact with one another or other objects. Additionally, the individual storage tray protects the saw blades from weather elements and moisture, which will rust and damage the saw blades. The trays open and close horizontally by pivoting on a permanently fixed single pin that is fixed through all the individual trays in the storage container.

The invention is configured in a plastic storage case with multiple storage trays, which includes a handle on top for transporting the storage case. Such a design provides a stable balance that prevents the present invention from tipping over with the weight of the blades when the tray is opened from the weight of the saw blades.

In use, each of the storage trays are opened by pulling on a drawer pull handle located on the outside panel of each tray that disengages the latching mechanism that holds the tray securely closed. When the tray is then pulled outward, the tray swivels open and blades can be placed on properly sized circular trays that can be modified to different diameters through the use of tray inserts. The tray inserts prevent the blades from shifting in the trays. To close the trays, the trays are pushed inward to swivel back into the storage container. The latching mechanism is then engaged resulting in the tray being locked in place. The diameter and height of the storage container is large enough to efficiently secure circular saw blades, yet small enough to transport handily. The top of the storage container is equipped with a single handle to conveniently pick up and transport the present invention.

In an alternative design of the storage container, individual trays are designed to hold various styles and special purpose saw blades, such as dado saw blades, in addition to the traditional circular saw blades.

DETAILED DESCRIPTION

The present invention is a portable storage container 10 for storing and transporting circular saw blades. The present invention is formed of a plastic and it includes several individual storage trays 20 and a handle 30 on top.

Figure 1:
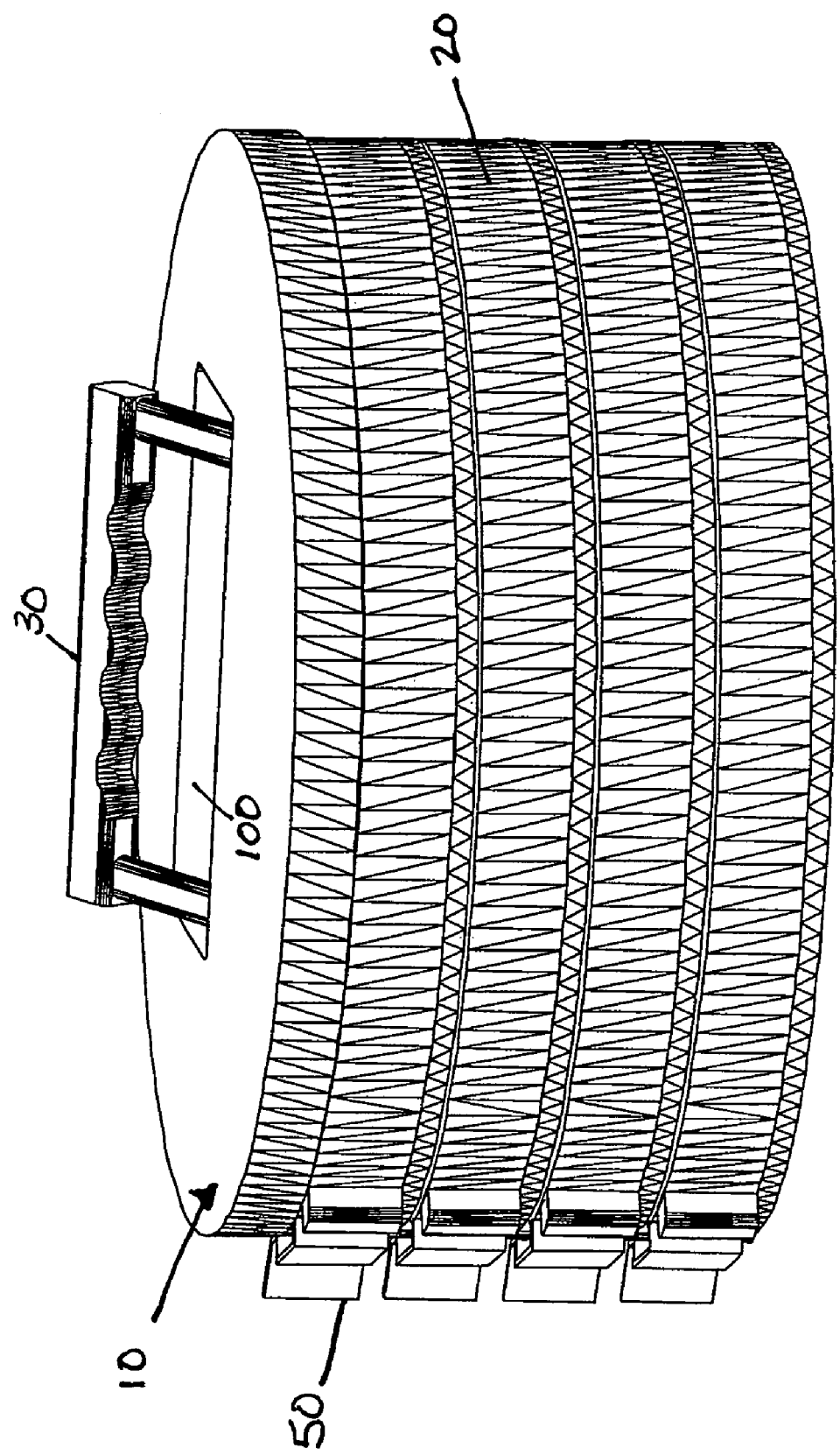
FIG. 1 shows an outside view of the storage container, with the handle in the upright position.
Figure 2:
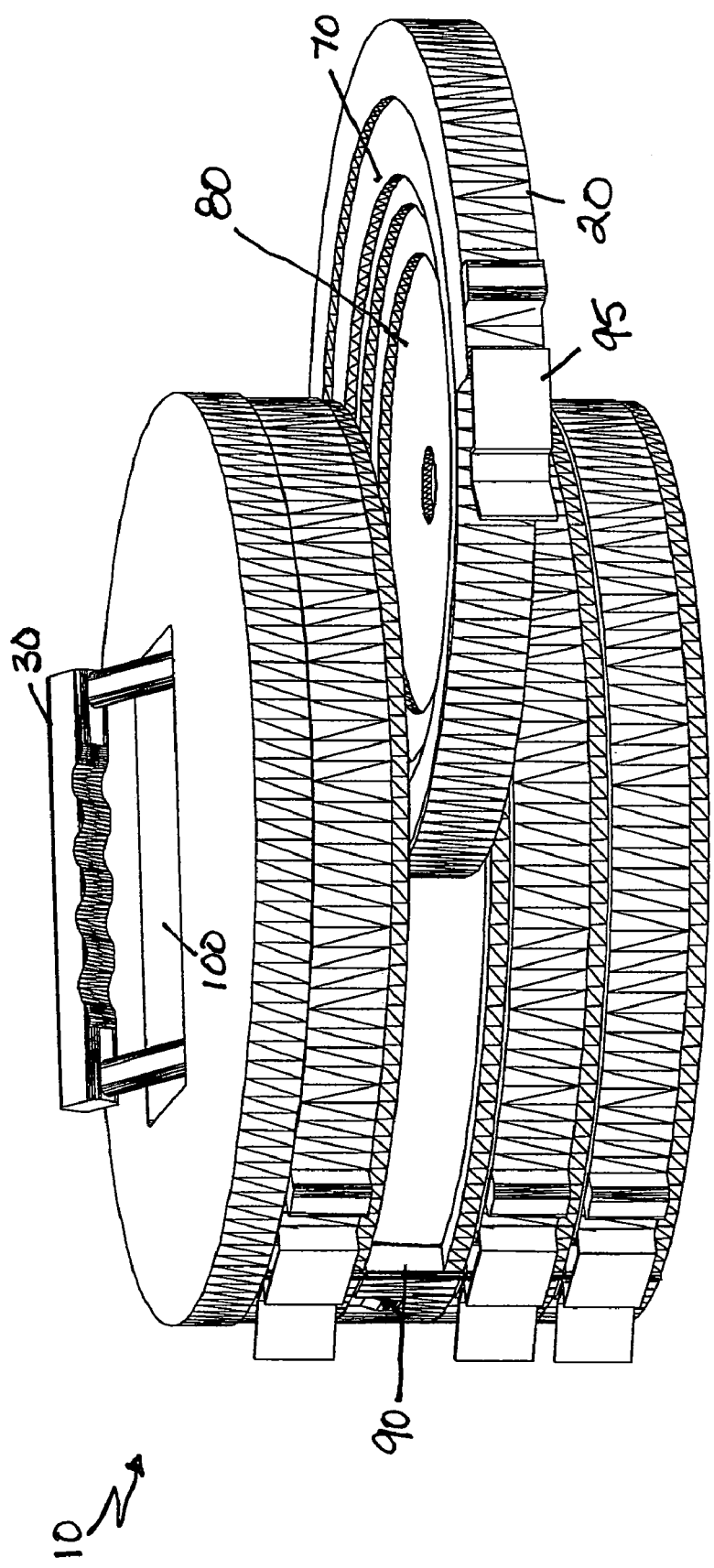
FIG. 2 shows an outside view of the storage container with one individual storage tray opened.

Turning to FIG. 1, the storage container 10 is constructed of a lightweight durable material, preferably a strong engineered plastic, such as high-density polyethylene. The storage container 10, is constructed so that it remains stable and avoids the possibility of tipping over when individual storage trays 20 are opened, as shown in FIG. 2. The usage of plastic allows the storage container 10 to be durable and strong enough to sufficiently protect the circular saw blades stored inside. The usage of plastic also allows the storage container 10 to be moisture resistant, as moisture can rust and corrode and further damage the circular saw blades stored in the storage container 10. The length and height of the storage container 10 is large enough to secure the circular saw blades, without hindering the present invention"s portability.

As shown in FIG. 1, a single handle 30 located at the top of the container easily and conveniently provides a means to carry the storage container 10. Individual storage devices often prove to be unsuitable for transporting saw blades to construction sites because of their design for holding a single saw blade. As a result, they prove to be inconvenient for users who need to use saw blades on construction job sites or who need to conveniently store saw blades in their workshop in a convenient single location. The present invention"s convenient size and portability allow the storage container 10 to be very portable.

Figure 3:
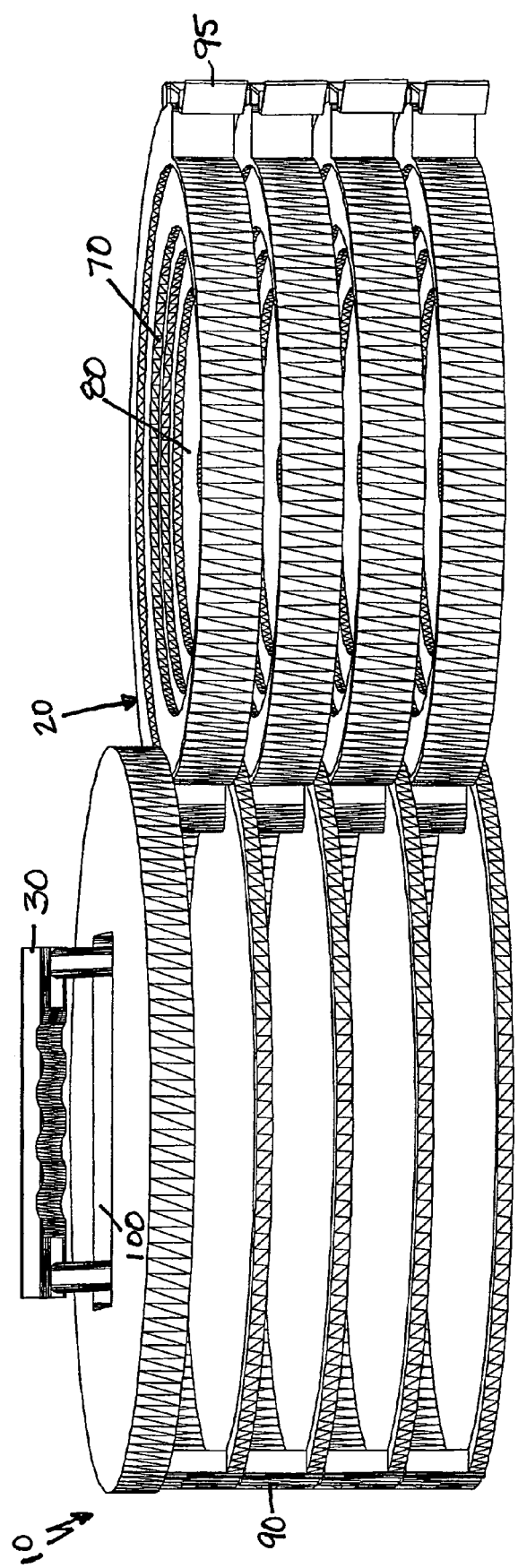
FIG. 3 shows the storage container with several of the storage trays opened.
Figure 4:
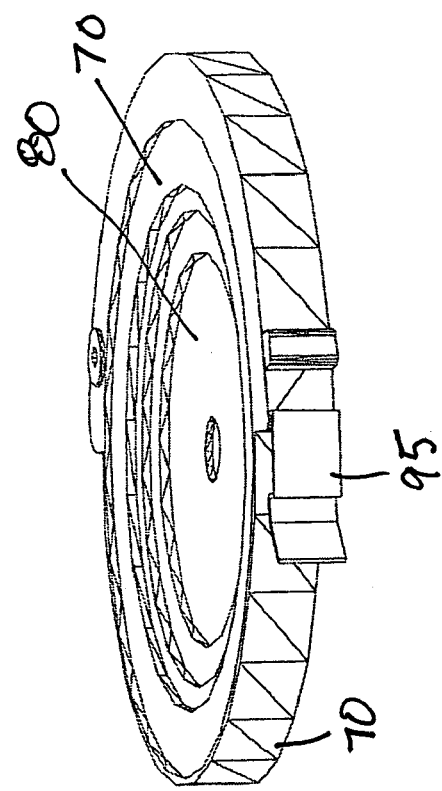
FIG. 4 shows an unassembled individual tray and the pivot pin location.
Figure 4:
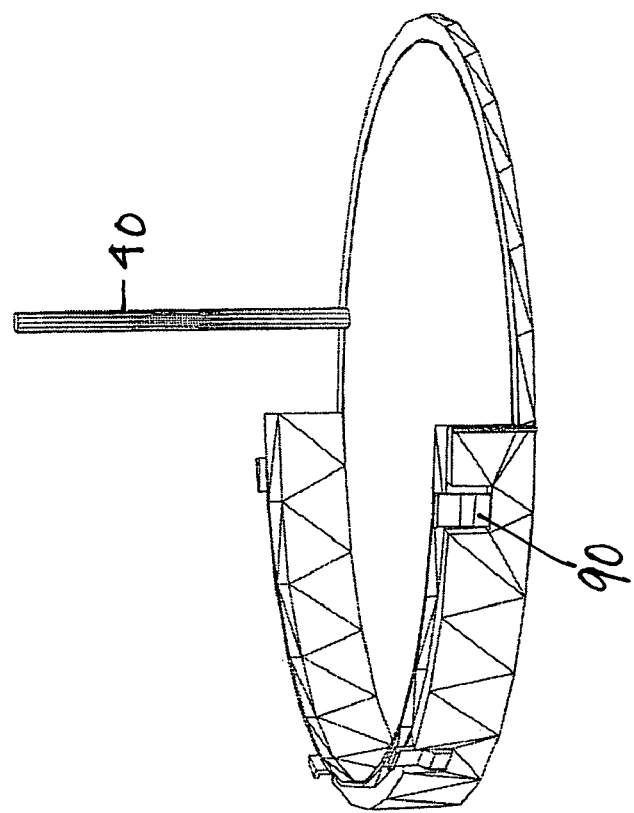

As shown in FIG. 3, several individual storage trays 20 are pivoted open. The circular saw blades fit and are securely stored in the individual storage trays 20. This view also shows inside the individual storage tray 20 and further shows the indented area 80 where circular blades can be stored. Contained in each individual storage tray 20 is a multiple interchangeable removable insert 70 that can hold various sizes and diameters of saw blades, which is shown in FIG. 4.

Also shown in FIG. 3, the individual storage trays 20 are shown after being pivoted open. They close horizontally on a metal pivot pin 40, which is permanently affixed through all the individual storage trays 20. The metal pivot pin 40 is shown exposed in FIG. 4.

In FIG. 2, the multiple interchangeable removable inserts 70 can be added or removed to allow the individual storage trays 20 inside diameter to be adjusted to accommodate various diameters of saw blades. Multiple interchangeable removable inserts 70 can be utilized in each individual storage tray 20 to adjust the individual storage tray 20 to the appropriate size to fit most any size blade. The individual storage trays 20 allow the blades to be stored and segregated in an organized manner.

As shown in FIG. 1, a storage tray pull mechanism 50 is located on the side panel of each individual storage tray 20. These storage tray pull mechanisms 50 allow the user easy and quick access to the circular saw blades located inside the storage tray 20.

Pulling the storage tray pull mechanism 50, disengages the first surface latching mechanism 90 from the second surface latching mechanism 95 on each individual tray 20. This unlatches, opens and allows each individual storage tray 20 to pivot open.

The individual storage tray 20 is pulled by using the storage tray pull mechanism 50 and then the individual storage tray 20 swivels open and the circular saw blades can be placed on individual interchangeable removable inserts 70. These interchangeable removable inserts 70 are placed inside the individual storage trays 20, allowing accommodation for various diameters, thickness and sizes of circular saw blades. This embodiment prevents the blades from shifting around inside the present invention. Pushing the individual storage tray 20 inward to swivel back into the storage container 10 closes the individual storage trays 20. When the individual storage tray 20 is pushed the first surface latching mechanism 90 engages the second surface mechanism 95 and this prevents the individual trays 20 from opening unintentionally and pivoting open in the storage container 10.

The present invention has the capability of safely storing various diameters and thicknesses of circular saw blades in the individual storage trays 20. This is accomplished through the use of multiple interchangeable removable inserts 70, which fit in the individual storage tray 20. This modifies the individual storage tray 20 inside storage area for storing various sized circular saw blades. Such an organized method of storing the saw blades provides the user easy access to and easy retrieval from the individual storage trays 20. This is beneficial for the user because it allows the user to use one storage container 10 for multiple sized saw blades. This is especially beneficial when the user is working at a construction site or in a workshop and needs to have immediate access to various precision saw blades. The organization of the present invention also prevents blades for becoming damaged or dulled during their storage and can prevent the user from suffering bodily harm if the blades are when not handled carefully. Without the structured individual storage trays 20 of the present invention, the circular saw blades would be stored in multiple containers and this would reduce the organization and convenience offered by the present invention.

Figure 5:
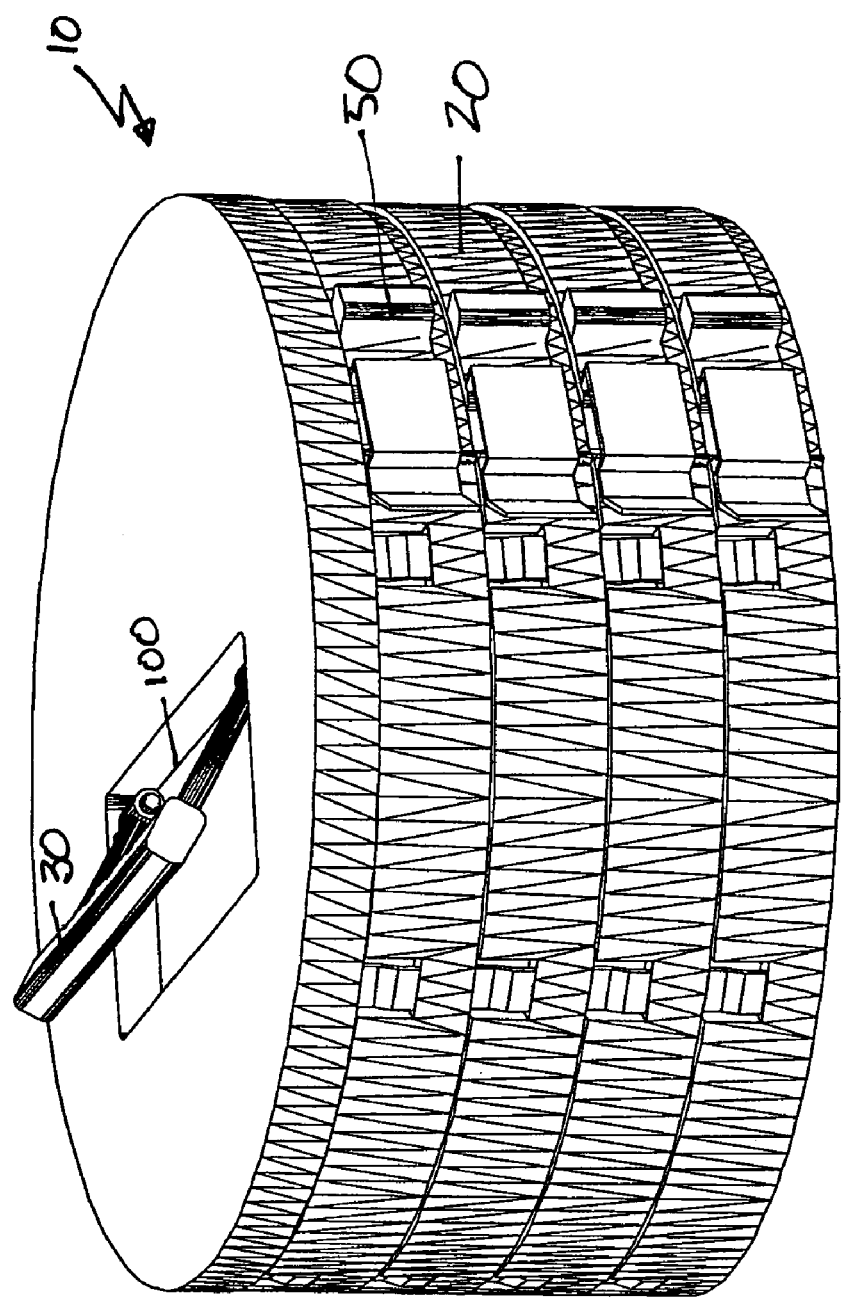
FIG. 5 is a view of the storage container with the handle folded down into the recessed indention on top of the storage container.

A single handle 30 is located on top of the storage container 10, as shown in FIG. 1 and FIG. 2. The handle 30 allows the storage container 10 to be easily and conveniently transported. The handle 30 folds down into an indented compartment 100 on top of the storage box 10, as shown in FIG. 5.

It is intended to be understood that only preferred depictions of the present invention have been described and that numerous substitutions, modifications, and alterations are allowable and are explained in the following claims:

The invention claimed is:

1. A generally circular case for carrying and storing circular saw blades, comprising:

at least one circular saw blade;

at least two storage trays; and a removable annular insert within said at least two storage trays;

wherein said insert alters a diameter of said at least two storage trays for limiting movement of said circular saw blade stored therein.

2. The case of claim 1, further comprising a pivot pin in communication with said at least two storage trays.

3. The case of claim 2, wherein said pivot pin is positioned along a circumference of each of said at least two storage trays.

4. The case of claim 1, further comprising a pull mechanism in communication with said at least two storage trays.

5. The case of claim 1, further comprising a latching mechanism in communication with said at least two storage trays.

6. The case of claim 1, further comprising a handle in communication with said at least two storage trays.

* * * * *